O. TERRIAN.
NUT LOCK.
APPLICATION FILED OCT. 30, 1911.
1,041,194.
Patented Oct. 15, 1912.
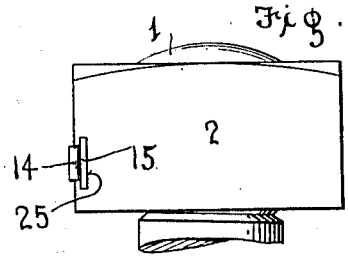
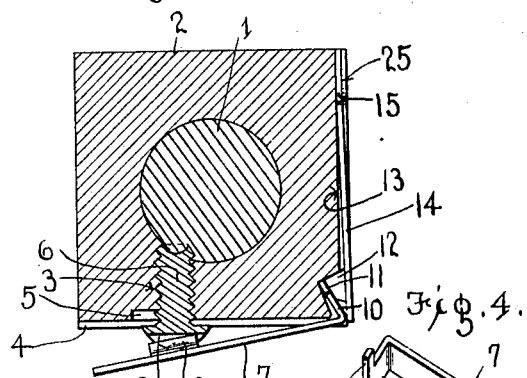
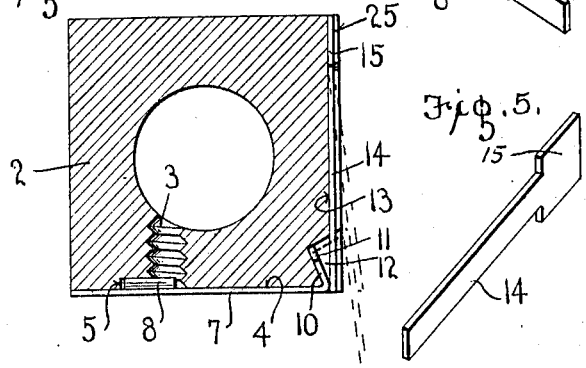
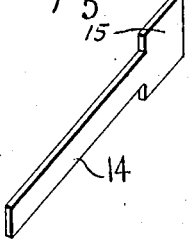
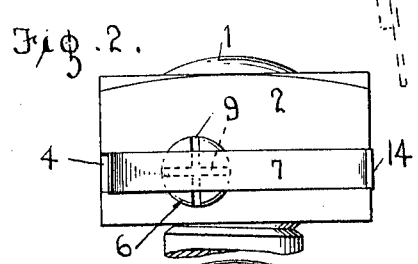
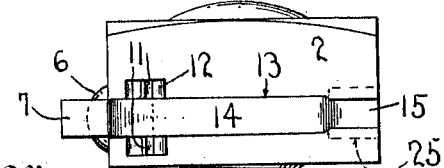
Witnesses
L. B. James
C. E. Hunt
Inventor
Otto Terrian
by H. B. Willson &co
Attorneys

UNITED STATES PATENT OFFICE.

OTTO TERRIAN, OF MANISTIQUE, MICHIGAN.

NUT-LOCK.

1,041,194.  Specification of Letters Patent.  Patented Oct. 15, 1912.

Application filed October 30, 1911. Serial No. 657,444.

*To all whom it may concern:*

Be it known that I, OTTO TERRIAN, a citizen of the United States, residing at Manistique, in the county of Schoolcraft and State of Michigan, have invented certain new and useful Improvements in Nut-Locks; and I do declare the following to be a full, clear, and exact description of the invention, such as will enable others skilled in the art to which it appertains to make and use the same.

This invention relates to improvements in nut locks.

One object of the invention is to provide a nut lock having an improved construction and arrangement of locking mechanism adapted to securely fasten the nut in its adjusted positions on the bolt and which may be readily released to permit the nut to be removed.

Another object is to provide a nut lock which will be simple, strong, durable and inexpensive in construction, efficient and reliable in operation and well adapted to the purpose for which it is designed.

With these and other objects in view the invention consists of certain novel features of construction, and the combination and arrangement of parts as will be more fully described and claimed.

In the accompanying drawings; Figure 1 is a cross sectional view through a bolt and nut showing the application of the invention thereto; Fig. 2 is a side view of the same; Fig. 3 is a similar view taken at right angles to Fig. 2; Fig. 4 is a detail perspective view of one member of the nut locking mechanism; Fig. 5 is a similar view of the spring for the screw fastening member; Fig. 6 is a sectional view of the nut before the set screw member of the lock has been applied and showing the position of the outer or screw fastening member of the lock to permit the engagement of a wrench for screwing the nut up on the bolt; Fig. 7 is a side view of the forms shown in Figs. 1 to 6, taken from the side opposite that to which the screw is applied.

Referring more particularly to the first six figures of the drawing, 1 denotes the bolt and 2 denotes the nut to which my improved lock is applied. The nut 2 has formed in one side thereof and to one side of the center a transversely disposed threaded passage 3 which communicates at its inner end with the bore of the nut. Also formed in the outer surface of the side of the nut in which the threaded passage 3 is arranged is formed a transversely disposed groove or channel 4 and a notch or recess 5, said notch or recess being arranged adjacent to one side of the passage 3 as shown.

Adapted to be screwed into the passage 3 is a set screw 6 the inner end of which engages and binds against the bolt 1 and thus securely holds the nut in its adjusted position on the bolt. In order to fasten the screw 6 in operative engagement with the bolt, I provide a screw fastening member comprising a plate 7 corresponding in width and thickness to the width and depth of the groove or channel 4 in the side of the nut, said plate having arranged on its inner side adjacent to its free end a substantially V-shaped detent or screw engaging block 8 which is adapted to be engaged with the screw driver slots or notches 9 in the head of the screw, said screw heads being provided with two of said notches 9 arranged at right angles to each other as shown. One end of the plate 7 is bent inwardly at an acute angle as shown at 10 and on the end of said angular bent portion are formed laterally projecting lugs 11, said angular bent end and lug being adapted to fit into and loosely engage an angular notch 12 formed in the side of the nut at right angles to the side having the groove or channel 4. In the side of the nut having the notch 12 and communicating with said notch is also formed a longitudinally disposed groove or channel 13 with which is engaged a flat leaf spring 14 one end of which is increased in width to form an attaching plate 15 said plate being secured in the end of the groove or channel 13 preferably by upsetting the edges of the grooves over the edges of the plate 15 as shown in Fig. 3 of the drawing. The free end of the spring 14 when thus secured bears against the angular bent end of the plate 7 and provides a yielding pressure on said end of the plate whereby the detent 6 thereon is held in operative engagement with the notches 9 in the head of the screw, said detent thus holding the screw against retrograde or unscrewing movement after the latter has been screwed inwardly into firm engagement with the bolt for the purpose of locking the nut thereon. It will be noted by reference to Fig. 6 of the drawings that before the set screw 6 has been applied and while the nut is being screwed up on the bolt the fastening plate 7 will be held in engagement with the groove 4 by the spring 14 while the detent 8 will engage the notch 5 thus permitting the outer surface of the plate 7 to lie flush with the outer surface of the adjacent side of the nut whereby a wrench may be readily applied to the nut to facilitate the screwing or unscrewing of the nut on or off the bolt.

Having thus described my invention, what I claim is;

1. In a nut lock, a nut having formed in one side a longitudinal groove and a recess and having in said side a threaded passage communicating at its inner end with the threaded bore of the nut, a set screw adapted to be screwed into said passage and into engagement with the bolt on which the nut is screwed, a screw fastening plate having one end bent at an angle and engaged with a recess in the side of the nut at right angles to the side having the groove, a detent arranged on the free end of said plate and adapted to engage said set screw, and means to secure said fastening plate in engagement with the nut whereby the detent thereon will fasten said screw and whereby when the screw is removed the plate and detent will spring into the groove and recess formed in the adjacent side of the nut, said plate thus being flush with the adjacent outer surface of the nut.

2. A nut lock comprising a set screw adapted to be screwed through one side of the nut and into engagement with the bolt on which the nut is screwed, a screw fastening plate having one end loosely engaged with one side of the nut, a detent arranged on the free end of said plate and adapted to engage the screw driver slots in the head of the screw, said screw head having a plurality of slots arranged at right angles to each other, and a plate actuating spring secured to the nut and adapted to bear against the nut engaging end of the screw fastening plate whereby the latter is held in yielding engagement with the screw.

In testimony whereof I have hereunto set my hand in presence of two subscribing witnesses.

OTTO TERRIAN.

Witnesses:
VIRGIL I. HIXSON,
M. FRANCES HIXSON.

---

Copies of this patent may be obtained for five cents each, by addressing the "Commissioner of Patents, Washington, D. C."